April 18, 1961 H. RENNER 2,980,514
APPARATUS FOR FRACTIONATED PARTITION AND SEPARATION OF DISSOLVED SUBSTANCES BETWEEN TWO LIQUID PHASES
Filed Jan. 18, 1957
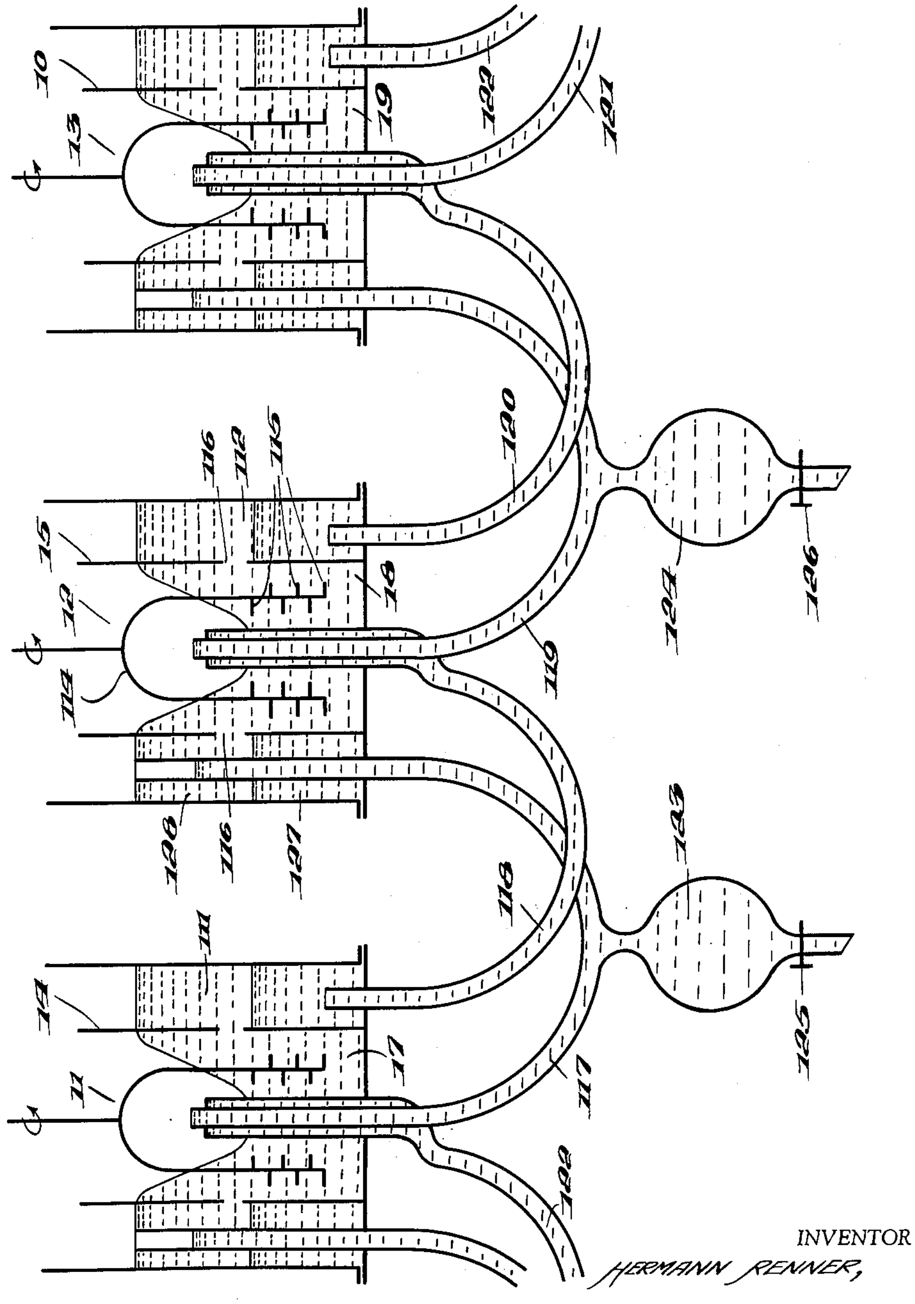
INVENTOR
HERMANN RENNER,
BY Bailey, Stephens and Huettig
ATTORNEYS 2,980,514

APPARATUS FOR FRACTIONATED PARTITION AND SEPARATION OF DISSOLVED SUBSTANCES BETWEEN TWO LIQUID PHASES

Hermann Renner, Konstanz (Bodensee), Germany, assignor to Deutsche Gold- und Silber-Scheideanstalt vormals Roessler, Frankfurt am Main, Germany Filed Jan. 18, 1957, Ser. No. 634,842

Claims priority, application Germany Jan. 19, 1956

3 Claims. (Cl. 23—270.5)

The present invention relates to a novel apparatus for the continuous partition of dissolved substances which have a different partition coefficient with respect to a liquid medium and for the separation of such substances.

The fractionated partition of substances between two liquid phases has already been carried out in columns in which the liquids which are to be brought into exchange relationship are usually moved countercurrently. However, only an incomplete exchange is effected in the individual steps of processes using such columns. The operating efficiency is relatively low, as the contact periods usually are short and, in view of the incidence of different sized droplets, the exchange is low at least with respect to the larger sized droplets. Furthermore, the possibility of regulation of the liquid flow is in general insufficient, as such columns are only accessible and regulatable in the end steps. The processes using columns, however, have the advantage that they require little attention and are dependable in operation.

In view of the insufficient exchange obtained in such processes employing columns, it has already been proposed to divide the columns to a certain extent into single elements and to unite these horizontally next to each other into a battery and to promote the exchange in each separating element by intensive stirring. Each of the separating elements in general consists of a mixing chamber and at least one settling chamber. The flow of the liquid in these known processes is effected with the aid of the difference in level of the liquid surface caused by the stirring. However, in the apparatus operating according to this principle which have become known siphons have been employed to connect the individual elements. Such siphons have, however, proved very prone to give rise to disturbances. Also, when pumps are used, this entails an additional apparatus cost. Even though these arrangements provide for greater efficiency, they are nevertheless only suited for discontinuous, that is, concurrent flow, operation or only suited for use with a large volume ratio between the lighter and heavier phases, that is, they can be used only with a large quantity of upper phase and a small quantity of lower phase.

The apparatus according to the invention provides a substantial advance in that it avoids the disadvantages of the previously known apparatus and combines their advantages. The apparatus according to the invention also operates according to the horizontal principle and comprises a series of connected separating vessels each of which contains a mixing chamber provided with a stirrer and a settling chamber. In such apparatus, the mixing chambers are connected with the settling chambers of neighboring separating vessels by communicating tubes passing through the bottom of such chambers which serve for passage of liquid.

The apparatus according to the invention provides a fully automatic flow of the non-miscible liquids of different weight employed for the extraction, so that they can be passed through the partition battery in every desired velocity relative to each other in any desired number of steps. The liquid flow can be regulated in a most simple manner whether a stationary phase is employed or whether two moving phases are employed which flow concurrently or countercurrently, without the necessity of providing special apparatus, such as costly pumps or undependable siphons. Within the capacity of the apparatus only the volumes of the liquids which are introduced at any desired points in the battery are determinative of the velocity of flow of the liquids. The use of the communicating tubes according to the invention for joining the individual separating elements renders it possible to provide a disturbance free flow of one or both of the liquid phases with the aid of gravity and the centrifugal force engendered by the stirring.

According to a preferred modification of the apparatus according to the invention, the tubes for introducing the liquids into the mixing chamber are located about in its center. Of course, in such instance, it is necessary that the stirring mechanism, which rotates about a vertical axis, must be located in the peripheral portion of the mixing chamber to leave the central space free, for example, by employing a stirrer with prong like or fork like stirring arms which leave the center of the mixing chamber free. Preferably, the centrally located tubes for the introduction of the light and heavy phases are concentrically arranged so that the space taken up by such tubes in the central portion of the mixing chamber is as small as possible.

According to a further advantageous modification according to the invention, the stirring mechanism is provided with a cylindrical or bell shaped jacket open at the bottom which surrounds a portion of the centrally located tubes for the introduction of the liquids in order to provide a definite path of flow for the liquids. Preferably, such jacket is provided with projections, extensions or stirring arms in order to intensify the stirring action.

In the construction of the individual separating elements it was found advantageous to combine the mixing chamber and settling chamber in one vessel by providing a cylindrical separating wall to separate the vessel into an inner mixing chamber and an outer concentric annular chamber serving as a settling chamber. Openings provided in such cylindrical wall connect the mixing chamber with the settling chamber. The height of such openings can serve to influence the flow of the liquids in the apparatus.

The accompanying drawing diagrammatically shows a preferred form of apparatus according to the invention.

The drawing shows three separating elements 11, 12 and 13, each of which is subdivided into a centrally located mixing chamber (17, 18 and 19) and an annular settling chamber (111, 112 and 113) by a cylindrical insert (14, 15 and 16). Stirrer 114, which leaves the central portion of mixing chamber 18 free, is provided in separating element 12. The lower portion of such stirrer 114 is provided with short stirring arms 115. Openings 116 are provided in cylindrical wall 16 to connect the mixing chamber 18 and settling chamber 112 of separating element 12. Tubes 117, 118, 119, 120, 121 and 122 are provided for the transfer of liquids between the individual separating elements, each of which connect the mixing and settling chambers of neighboring separating elements. The communicating tubes 117 and 119 which serve to convey the lighter liquid phase are provided with spherical enlargements 123 and 124 at their lowest points. Drain valves 125 and 126 are provided for such spherical enlargements. The function of such enlargements and drain valves will be described more fully below.

The mode of operation is as follows when the apparatus is employed for the separation of two nonmiscible liquid phases of different density with countercurrent flow of both phases:

Both phases are introduced continuously into the mixing chamber 18 of the middle separating element 12 through concentrically disposed tubes 119 and 118, the latter in the selected instance serving to introduce the heavier phase and the former to introduce the lighter phase. An intensive intermixing of both phases is effected with stirrer 114, through which equilibrium with respect to the exchange of substances between the phases is reached. As in the continuous operation of the apparatus, new liquid is continuously supplied, the dispersed phase mixture flows around the bottom open end of the stirrer and reaches the outer portion of the mixing chamber and from there reaches the settling chamber 112 through openings 116. The phases settle according to their weight in the settling chamber and because of the quiescence of the liquid in such chamber. As a consequence, the heavier phase collects in the lower portion 127 of settling chamber 112 and the lighter phase collects in upper portion 128. The heavier phase continuously flows off through tube 120 and reaches the next separating element 13 where it is again mixed with a stream of the light liquid phase and separated as described above. The lighter phase is drawn off from the upper portion 128 of the settling chamber and passed in the opposite direction to the mixing chamber of separating element 11 and mixed there with the heavier phase of the next step.

The transfer of the phases from the settling chamber of one separating element to the mixing chamber of the neighboring elements is effected through the difference in liquid level in the outer portion of the separating elements from which the liquids flow and the inner portion in which the liquids are introduced which is induced by the stirring action. The height of tube 117 in separating element 12 is determinative of the discharge of the upper phase. The height of the discharge end of such tube in separating element 11 of course must be lower than its inlet end in settling chamber 112 in separating element 12. The discharge of the heavier lower phase and the position of the boundary between the light and heavy phases with the given total liquid height and the given difference in density of each phase is solely dependent upon the height of the opening of tube 120 in separating vessel 13.

The introduction of the fresh phases expediently is effected at elements lying at both ends of the battery, preferably into their mixing chambers from above. The upper phase can be withdrawn from the last separating element by direct flow from a tube corresponding to tube 118, whereas the lower phase is drawn off outside of the battery.

As under certain circumstances a portion of the heavier phase can be carried along with the light phase being transferred to the neighboring separating element and collect in the lowest portion of the communicating tube and therefore cause disturbances in flow, it is advantageous to provide collecting vessels 123 and 124 in the lowest portions of tubes 117 and 119 serving for the transfer of the lighter phase. Drain valves 125 and 126 are provided to draw off the heavier phase which may collect in such collecting vessels. Similar complications do not occur in the transfer of the heavier phase in view of the differences in density of the two phases.

In the separation of hafnium and zirconium values, a 13 step apparatus according to the invention can be used in which water and diethyl ether are employed as the nonmiscible solvents. The flow of such solvents is countercurrent and the volume ratio 5:4. The hafnium-zirconium mixture to be separated is introduced in a middle step in the form of a concentrated aqueous solution of their thiocyanate salts. The throughput of the lighter phase amounts to 15 liters per hour and the throughput of the heavier phase amounts to 12 liters per hour with a throughput of 1 mol of salt mixture. The capacity of each separating element is about 3 liters.

I claim:

1. In an apparatus for the fractionated partition and separation of dissolved substances between two liquid phases of different density, the combination of a plurality of separating units joined with each other in horizontal relationship, each comprising a mixing chamber provided with a bell shaped stirrer rotating about a vertical axis leaving the center portion of the mixing chamber free and adapted and arranged to provide a vortex in the liquid stirred and at least one settling chamber, and communicating tubes connecting the mixing and settling chambers of neighboring separating units for the separate transfer of liquid from the top zone and from the bottom zone of the settling chamber of each separating unit to the mixing chambers of neighboring units, the outlet ends of the communicating tubes in the mixing chambers being centrally located and concentrically disposed, said outlet ends furthermore being below the upper plane of the liquid in the settling chambers but in the free space above the vortex above the stirred liquid in the mixing chambers.

2. An apparatus according to claim 1 in which drain valves are provided at the lowest point in the tubes serving to transfer the lightest phase from the settling chambers of the separating units to the mixing chambers of neighboring units.

3. An apparatus according to claim 1 in which each of said separating units comprise a vessel, a cylindrical wall within said vessel separating said vessel into a centrally located mixing chamber and a concentric annular chamber serving as a settling chamber and openings in said wall serving as communication between the mixing chamber and settling chamber.

References Cited in the file of this patent

UNITED STATES PATENTS 2,405,158 Mensing ---------------- Aug. 6, 1946

OTHER REFERENCES

Berger: German application, Serial No. 26,398, printed Dec. 1, 1955 (K 12e IVc, 1 sht. spec., 1 sht. dwg.).